United States Patent [19]

Itoh

[11] Patent Number: 4,724,794
[45] Date of Patent: Feb. 16, 1988

[54] FLUID-ASSISTED GRANULATING AND COATING APPARATUS

[75] Inventor: Yoshihiro Itoh, Saitama, Japan
[73] Assignee: Fuji Paudal Kabushiki Kaisha, Osaka, Japan
[21] Appl. No.: 893,266
[22] Filed: Aug. 5, 1986
[51] Int. Cl.⁴ ................................................ B05C 5/00
[52] U.S. Cl. .............. 118/303; 118/DIG. 5; 118/19; 425/222
[58] Field of Search ............ 118/DIG. 5, 303, 326; 427/213; 425/222, DIG. 20; 264/117

[56] References Cited

FOREIGN PATENT DOCUMENTS 59-21651  5/1984  Japan.
60-25182  6/1985  Japan.

Primary Examiner—John P. McIntosh
Attorney, Agent, or Firm—Shefte, Pinckney & Sawyer

[57] ABSTRACT

Fluid-assisted granulating and coating apparatus having a circular planar material circulation plate assembly rotatably mounted coaxilly within a cylindrical work area of an upright vessel, the plate assembly including a plurality of concentric circular slots opening radially outwardly into the work area for directing a suspension fluid radially outwardly thereinto for enhanced material circulation in a circularly spiraling fashion without undesirable concentration or stagnation of charge material within the work area and without undesirable material loss through or clogging of the fluid flow slots. This remarkable effectiveness of the apparatus enables its operation under either fluidized or non-fluidized conditions to provide significant flexibility in controlling the characteristics of granules produced. Inclined radial deflection plates may be affixed to the plate assembly for enhanced axial movement of charge material and upwardly angled rotating impulse blades may be used with the plate assembly for opposed radial circulation of charge material within the upper region of the work area, for enhanced material circulation and increased material capacity of the apparatus.

31 Claims, 11 Drawing Figures

FLUID-ASSISTED GRANULATING AND COATING APPARATUS

BACKGROUND OF THE INVENTION

The present invention relates generally to apparatus for forming powder materials into granules and for coating granules utilizing a binder liquid and, more particularly, relates to such apparatus of the type utilizing a gaseous fluid for treating the work material during the granulation or coating process.

In various and diverse technologies, it is desirable to process raw material in powder form into larger agglomerated granules and, often, to provide such granules with distinct layers or coats of differing materials. Preferably, such agglomerated granules should be substantially spherical in shape and as uniform as possible in composition and density for ease of flowability and handling of the granules andto enhance the quality of end products formed therewith.

Various forms of granulating apparatus which have been developed over past years have proved in practice to suffer varying disadvantages. So-called spheronizing apparatus utilize a rotating plate disposed within a cylindrical or otherwise round chamber for centrifugally impacting a charge material in moistened or pellet form against the interior wall of the vessel to progressively deform and plasticize the pellets into a spherical shape. This apparatus may also be utilized for applying a powder coating to charge material already processed into spherical granular form. Disadvantageously, this apparatus requires an initial processing of material into pellet form utilizing an extruder and/or a kneading machine and further requires that the spherical granules produced be transferred to a further machine for drying to remove the liquid moistening or wetting agent. Such spheronizing apparatus is difficult, if not impossible, to utilize for producing granules directly from wetted powdered material. Additionally, the resiliency of granules produced by such spheronizing apparatus cannot be selectively varied widely with granules typically being generally dense and hard. The capability of such apparatus for selectively producing a range of granule sizes is also restricted with this apparatus being particularly unsuitable for producing relatively fine granules.

In somewhat similar agitative type granulating apparatus, rotatable stirring blades and disintegrating chopper blades operate in conjunction with one another in a granulating vessel for simultaneously agglomerating and disintegrating powdered material treated with a binder solution to progressively form the powdered material into granules. As with the afore-described spheronizing apparatus, the resiliency of the granules produced by such agitative granulating apparatus cannot be widely varied, the granules characteristically being relatively hard and dense with high compressive strength, and removal of the binder liquid from the granules also requires processing of the granules in a separate drying machine. Moreover, the shape of the granules produced is relatively irregular and is not always spherical, and the granule size distribution is normally wide. This type of granulating apparatus also has no coating capability.

Fluidized bed granulating machines have been developed which essentially combine the functions of an extruder, a spheronizer and a dryer for granule formation and coating. In such apparatus, powdered charge material is fed into a vessel having a stationary screen or perforated plate and is treated on the charge side of the screen or plate with a binder liquid while a gaseous drying fluid such as air is forced through the screen or plate from the opposite side to create a fluidized suspension of the powdered material permitting it to be adhered by the binder liquid into granular form and simultaneously dried. This type of fluidized granulating apparatus is considered disadvantageous in that the granules formed are typically soft and porous with a relatively low density, while the granule shape is normally somewhat irregular and the granule size distribution is relatively wide. While this apparatus is capable of coating a granular charge material with a liquid film, it generally is not possible to perform powder coating operations since the suspension fluid tends to segregate granular and powdered materials due to their differing relative densities. Furthermore, even though film coating operations are possible, any significant irregularity in the granular shapes produced in this type of apparatus makes it difficult to obtain a uniform film coating on such granules.

To overcome some of the aforementioned disadvantages, some fluidized bed granulating and coating apparatus have replaced the stationary screen or plate with a rotating plate which may be either perforated or imperforate. In such apparatus, the rotating plate acts centrifugally on the charge material while the suspension fluid flowing through the spacing between the rotating plate and the vessel, as well as through any perforations in the rotating plate, acts upwardly on the charge material, to simultaneously circulate the material circumferentially about the vessel as well as in a radially spiraling fashion radially outwardly along the rotating plate, axially upwardly along the vessel and radially inwardly and downwardly in return to the rotating plate. Advantageously, this type of fluidized apparatus provides the capability of controlling the density and hardness of the granules produced by varying the velocity of the suspension fluid and the rotational speed of the plate. Additionally, both film coating and powder coating of granules are possible with minimal segregation problems. However, significant problems have been encountered in regulating flow of the suspension fluid through this apparatus to obtain the desired material circulation. As will be understood, the use of an imperforate rotating plate severely restricts the amount of gas flow through the vessel and accordingly perforated plates are preferred to achieve sufficient minimum flow of the suspension fluid. On the other hand, in the use of perforated plates, difficulty is encountered in the proper selection of the size of the perforations in that openings which are too large increase the risk that the powdered charge material may fall downwardly through the perforations while openings which are too small are subject to becoming clogged by the charge material, resulting in increased restriction to the desired flow of the suspension fluid. Accordingly, such apparatus typically are operated only under fluidized conditions utilizing a sufficient flow of the suspension fluid to fully suspend the charge material, thereby to be prevent material loss or clogging of the fluid openings. As a result, however, such apparatus are disadvantageously unsuitable for use under non-fluidized conditions at lesser flow volumes of the suspension fluid.

Additionally, the maximum quantity of charge material which any given apparatus of this type is capable of handling is limited by the combined capacity of the rotating plate and the flow of suspension fluid to maintain the charge material continuously in the desired circulation afore-described. When greater quantities of charge material are attempted to be processed, the limited circulatory capacity of the apparatus results in the creation of a generally stagnant non-moving portion of the charge material above the circulation zone and, in turn, results in relatively wide granule size distribution, irregular granule shape and non-uniform coating of the granules as well as lower productivity per unit volume of the apparatus. Increased rotational speed of the rotating plate merely produces material slippage and resultant frictional heat without enhancing circulation of the charge material and, similarly, increased suspension fluid flow merely exaggerates the stagnation effect and causes the apparatus to operate more in the nature of a stationary screen-type fluidized bed apparatus.

As one means of correcting the problem of controlling the size of the suspension fluid flow openings, some fluidized granulating and coating apparatus have been provided with a modified rotating plate assembly utilizing a plurality of annular rings of increasing diameter arranged in a conical or pyramidal stacked spaced relation to provide annular fluid flow openings between the rings which open radially outwardly rather than upwardly within the vessel to attempt to restrict entry of the charge material into the openings by directing the flow of the suspension fluid radially outwardly of the rotating plate as the fluid passes through the plate. However, since the openings between the rings, albeit radial, are still substantially straight in the radial direction, the plate assembly has been found in practice to be subject nevertheless to the passage of the charge material through the openings and, therefore, such apparatus must still be operated under fluidized conditions only. Moreover, the pyramidal or conical shape of the plate assembly radially outwardly from the centermost annular ring disadvantageously produces a tendency of the radially spiraling circulation of the charge material to be undesirably concentrated at the radially outwardmost extent of the plate assembly. In turn, the flow of the suspension fluid is undesirably restricted through the radially outwardmost annular openings and through the peripheral spacing between the plate assembly and the vessel and, as a result, a greater volume of the suspension fluid flows through the radially inwardmost annular openings and is not fully utilized for circulating and drying the charge material. Accordingly, the radially spiraling circulation of the charge material is impaired and, moreover, the granules produced are unevenly dried by the suspension fluid.

SUMMARY OF THE INVENTION

It is accordingly an object of the present invention to provide an improved fluid-assisted granulating and coating apparatus having a rotating plate assembly of the annular ring-type last above-described which overcomes the disadvantages thereof. Another object of the present invention is to provide an improved fluid-assisted granulating and coating apparatus capable of effectively operating under either fluidized or non-fluidized conditions. It is a further object of the present invention to provide an improved fluid-assisted granulating and coating apparatus having a substantially increased production capacity with improved material circulation characteristics over conventional fluidized bed apparatus. Another object of the present invention is to provide an improved fluid-assisted apparatus capable of producing highly spherical and uniformly dense granules.

Briefly described, the present granulating and coating apparatus includes an upright vessel having an annular wall defining a work area with a material charge port and a material discharge port opening into the work area, and a plate assembly mounted within the vessel below the work area transversely of the annular wall at a close peripheral spacing thereto for rotation about an axis extending axially of the annular wall for circulating charge material within the work area centrifugally outwardly toward and circumferentially along the annular wall. The plate assembly has a generally planar radial work surface facing the work area and has a plurality of annular slots opening at radial spacings to one another in a generally radially outward direction through the work surface. A spray or similar arrangement is provided for emitting a binder liquid into the work area for impingement on charge material within the work area. Another arrangement is provided for conveying a gaseous fluid from below the plate assembly upwardly through the annular slots for emission therefrom in a generally radially outward direction for enhanced circulation of charge material radially outwardly within the work area.

In the preferred embodiment of the present apparatus, the annular wall of the upright vessel is cylindrical and the plate assembly is circular and is mounted radially of the cylindrical wall for rotation about the axis thereof. The plate assembly is constructed of a plurality of circular elements mounted on a supporting hub concentrically side-by-side one another in substantially coplanar relation for defining the planar radial work surface on the side of the assembly facing the granulation work area and for defining the annular slots as circular between the circular elements. The circular elements are configured, preferably in a generally S-shaped cross-section, providing each slot with an inlet portion opening at the side of the plate assembly opposite its radial work surface, an outlet portion opening at the radial work surface at a radially outward spacing from the inlet portion, and a connecting portion extending generally radially therebetween. In this manner, the circular elements generally overlap one another at the work surface for radially outward opening of the circular slots as described with the slots partially covered for restricting passage of charge material from the work area into the slots. Preferably, the circular slots are respectively of gradually increasing cross-sectional areas in the direction radially outwardly of the plate assembly.

In one embodiment of the present apparatus, a plurality of deflection elements, preferably a pair, are affixed in diametrical opposition to the plate assembly, each deflection element being of a plate-like configuration having a leading edge portion extending radially along the work surface of the plate assembly and having a material deflection surface extending at an acute angle to the work surface in the circumferential direction opposite the direction of rotation of the plate assembly for imparting increased upward movement of the charge material within the work area to enhance circulation thereof axially within the work area. Each deflection element is tapered increasingly radially outwardly with respect to the plate assembly to have an increasing dimension circumferentially and axially of the plate assembly in the radially outward direction for increased deflection of charge material adjacent the annular wall.

According to another embodiment of the present apparatus, a plurality of blade-like impulse elements, preferably a pair, are arranged in diametrical opposition for rotation coaxially with and in the same direction as the plate assembly with the impulse elements extending radially outwardly and upwardly at an acute angle with respect to the plate assembly for impulsively circulating charge material at a spacing above the plate assembly in a radially inward direction within the work area to enhance material circulation and increase the material capacity of the apparatus. Preferably, each impulse element has an impact surface inclined upwardly away from the plate assembly in its direction of rotation. As desired, the impulse elements may be arranged for rotation either integrally with or independently of the plate assembly. Also, the deflection elements and the impulse elements may be used in combination with one another, as desired.

DESCRIPTION OF THE PREFERRED EMBODIMENT

Figure 1:
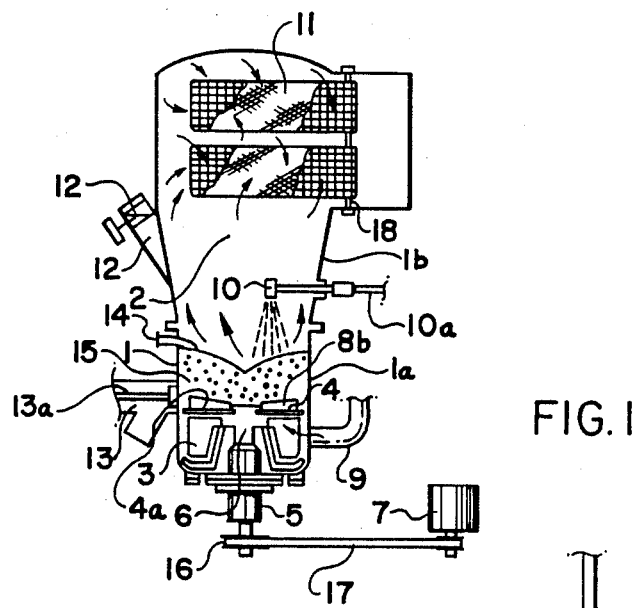
FIG. 1 is a schematic representation in vertical cross-section of a fluid-assisted granulating and coating apparatus according to the preferred embodiment of the present invention.

Referring now to the accompanying drawings and initially to FIG. 1, one embodiment of the fluid-assisted granulating and coating apparatus of the present invention is schematically illustrated in vertical cross-section and includes a substantially circular upright vessel 1 having a substantially cylindrical annular lower wall 1a defining a granulation and coating work area 15 and a frusto-conical upper annular wall 1b extending from the cylindrical wall 1a defining a filter chamber 2. The upper and lower axial ends of the vessel 1 are closed by suitable cover plates. A material inlet chute 12 is affixed to and opens to the interior of the vessel 1 for supplying charge material to the work area 15, the inlet chute being openable and closeable by a suitable valve arrangement 12a. A product outlet chute 13 is similarly affixed to and opens into the interior of the vessel 1 at the lowermost region of the work area 15 and is openable and closeable by a sliding piston arrangement 13a for discharging the granulated and/or coated product produced in the vessel 1. Another inlet duct 14 is mounted to the vessel 1 and projects therethrough to the interior thereof for feeding powder coating material to the work area 15 as desired for performing a powder coating operation on granular material within the work area 15.

A circular plate assembly 4 of a slotted planar construction, described more fully hereinafter, is rotatably mounted within the lowermost region of the vessel 1 immediately below the work area 15 on a vertical shaft assembly 6 supported rotatably by a bearing 5 mounted to the bottom end wall of the vessel 1 to orient a radial work face 4a of the plate assembly 4 radially with respect to the cylindrical wall 1a at a close peripheral spacing thereto for rotation about the axis of the cylindrical wall 1a. The shaft assembly 6 projects axially outwardly from the bottom end wall of the vessel 1 and has a pulley 16 affixed to the projecting end of the shaft assembly 6 by which the shaft assembly 6 and the plate assembly 4 are unitarily driven by a drive belt 17 from a suitable electric motor 7 or other appropriate power source. As described hereinafter, the plate assembly 4 is thusly operative for circulating charge material within the work area 15 centrifugally outwardly toward and circumferentially along the cylindrical wall 1a. An arrangement of deflection plates 8b, also described hereinafter, is affixed to the radial work face 4a of the plate assembly 4 for enhancing circulation of charge material axially within the work area 15.

A spray arrangement 10, which may be of any suitable conventional construction, is mounted interiorly within the vessel 1 immediately above the work area 15 and communicates through an appropriate conduit 10a with a source of an agglomerating solution or other suitable binder liquid, which may be simply water, for emitting the binder liquid into the work area 15 for impingement on charge material within the work area 15 for performing granule agglomeration and/or liquid film coating operations. A duct 9 opens into the vessel 1 below the plate assembly 4 and communicates with a source of air or other gaseous suspension and/or treating fluid for directing the fluid upwardly through the slotted plate assembly 4 and through the work area 15 to provide a treating flow of the fluid for the charge material within the work area 15. A set of baffle members 3 are rigidly affixed to the underside of the plate assembly 4 for evenly distributing the flow of the treating fluid across the plate assembly 4. An outlet opening 18 is formed laterally in the vessel wall 1b at its upward end for discharging the gaseous fluid from the vessel 1. A conventional bag filter arrangement 11 is mounted within the outlet opening 18 and projects into the upper end of the filter chamber 2 of the vessel 1 for removing any of the charge material suspended in the gaseous fluid as it is exhausted from the vessel 1.

Figure 2:
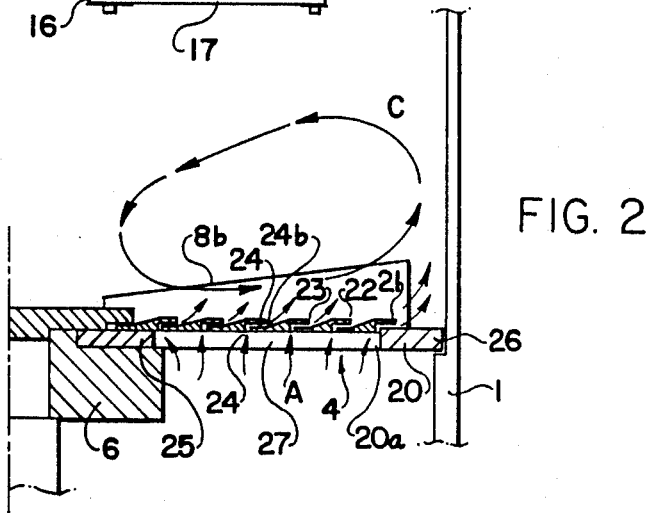
FIG. 2 is an enlarged vertical cross-sectional view of the rotating plate assembly of the apparatus of FIG. 1.
Figure 2A:
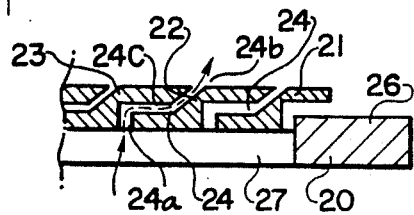
FIG. 2A is a detailed vertical cross-sectional view of the circular annular elements and the slots defined therebetween in the plate assembly of FIG. 2.

Referring now more particularly to FIGS. 2, 2A, 2B and 3, the particular construction of the plate assembly 4 is shown in greater detail. The plate assembly 4 includes a supporting hub or plate 20 affixed to the shaft assembly 6 with a plurality of circular ring elements 21, 22, 23, etc. of varying diameters mounted to the support hub 20 in concentric spaced relation to one another. The support hub 20 includes an inner circular ring 25 by which the hub 20 is fixed to the shaft assembly 6, an outer circular ring 26 of slightly smaller diameter than the inner diameter of the cylindrical wall 1a, and four equidistantly-spaced radial connecting arms 27 extending radially between the rings 25,26, thereby defining four sector-shaped quardrant openings 20a through the support hub 20. Preferably, the outer circular ring 26 is of a sufficient outer diameter to restrict the area of the annular spacing between the ring 26 and the cylindrical wall 1a to be less than one percent (1%) of the total cross-sectional area of the vessel 1 at its cylindrical wall 1a. The circular annular ring elements 21,22,23, etc. are of varying diameters and are affixed to the supporting hub 20 concentrically therewith and with each other in radially-spaced, side-by-side, substantially coplanar relation over the quadrant openings 20a to define with the support hub 20 the radial work surface 4a at the side of the support hub 20 to which the rings 21,22,23, etc. are affixed and to define a plurality of circular annular slots 24 between the ring elements 21,22,23, etc., to provide communication through the quadrant openings 20a of the plate assembly 4. As best seen in FIG. 2A, the circular ring elements 21,22,23, etc., are of a generally S-shaped cross-sectional configuration to generally overlap one another at the radial work surface 4a of the plate assembly 4 to define the circular slots 24 to open thereat in a generally radially outward direction with the slots 24 partially covered to restrict the charge material in the work area 15 from gravitationally falling downwardly through the slots 24. Specifically, the S-shape of the ring elements 21,22,23, etc. define the slots 24 to be of a similar S-shape with each slot 24 having a radially inward inlet portion 24a, a radially outward outlet portion 24b, and a generally horizontal connecting portion 24c extending radially therebetween. In this manner, the flow of gaseous fluid from below the plate assembly 4 is directed by the slots 24 to be directed into the work area 15 in a generally radially outward direction complimentary to the centrifugally outward material movement imparted by rotation of the plate assembly 4, as indicated by the directional arrows in FIGS. 2,2A and 2B. The respective diameters of the ring elements 21,22,23, etc. are selected to provide the circular slots 24 with respectively increasing cross-sectional areas in the direction radially outwardly along the plate assembly 4 to provide increased fluid flow at the radial outward region of the work area 15 whereat the greatest quantity of the charge material resides at any given moment in the operation of the apparatus.

Figure 2B:
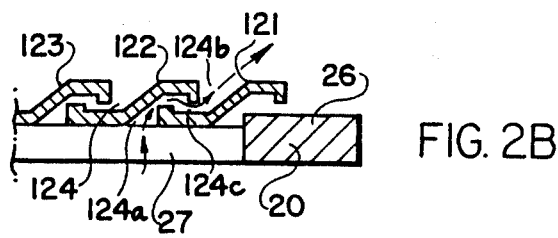
FIG. 2B is another vertical cross-sectional view similar to FIG. 2A showing an alternate embodiment of circular annular elements and annular slots in another embodiment of the plate assembly of the present invention.
Figure 3:
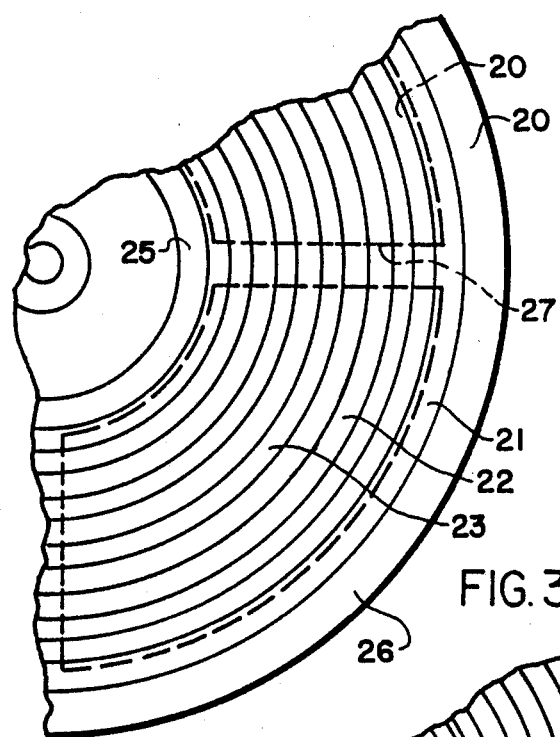
FIG. 3 is a plan view of the plate assembly of the apparatus of FIG. 1.

An alternative embodiment of the plate assembly 4 is shown in FIG. 2B having circular ring elements 121,122,123, etc. of a differing S-shaped cross-sectional configuration defining correspondingly shaped slots 124 having inlet, outlet and connecting portions 124a,124b,124c, respectively. Of course, as those persons skilled in the art will readily recognize, the plate assembly 4 may be constructed with circular ring elements of other variations of S-shaped cross-section or of any other appropriate shape providing overlapping coplanar orientation of the circular rings to define radially outwardly opening slots.

Figure 4:
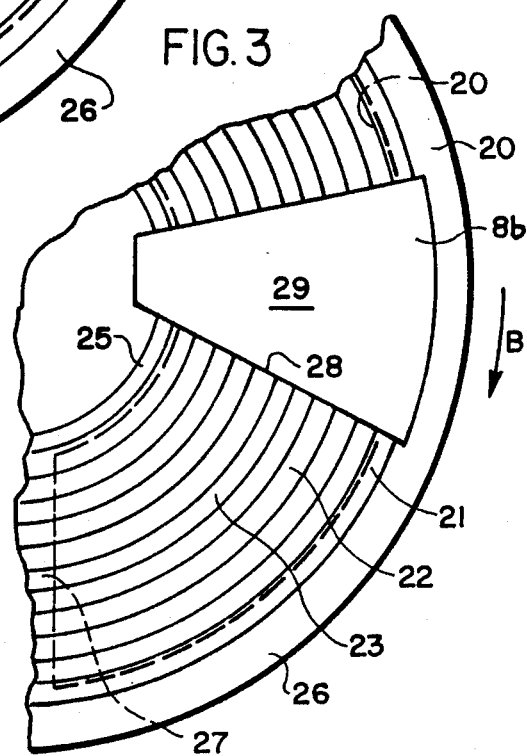
FIG. 4 is a plan view similar to FIG. 3 showing the deflection plate arrangement in conjunction with the plate assembly.
Figure 5:
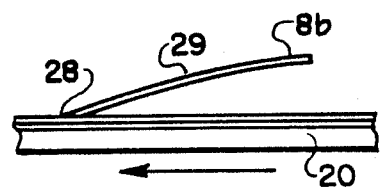
FIG. 5 is a side elevational view of the deflection plate arrangement and the plate assembly of FIG. 4.

Referring now to FIGS. 1, 4 and 5, a pair, or other desired plurality, of the deflection plates 8b are affixed in diametrical opposition to the support hub 20 and the circular ring elements 21,22,23, etc. at the radial work face 4a of the plate assembly 4. Each deflection plate 8b is of a longitudinal dimension slightly less than the radius of the plate assembly 4 with an increasing outwardly tapered transverse dimension and is affixed with one longitudinal edge 28 extending radially along the work surface 4a of the plate assembly 4 in leading relation to the remainder of the deflection plate 8b which extends from the edge 28 in acute angular relation to the work surface 4a in the circumferential direction opposite the direction of rotation of the plate assembly 4 (indicated by directional arrow B in FIG. 4). In this manner, the deflection plates 8b leave the circular slots 24 in the plate assembly 4 substantially unrestricted while presenting a material deflection surface 29 angularly in the direction of rotation of the plate assembly 4 with an increasing dimension circumferentially and axially of the plate assembly 4 in the direction radially outwardly thereof to operate to deflect charge material within the work area 15 axially away from the radially work surface 4a of the plate assembly 4 to enhance circulation of charge material within the work area 15 with the degree of deflection increasing radially outwardly toward the cylindrical wall 1a.

The operation of the granulating and coating apparatus will thus be understood with reference to FIGS. 1 and 2. Initially, the electric motor 7 is energized to actuate rotation of the shaft assembly 6 and the plate assembly 4 and a desired flow of air or other gaseous treating fluid is introduced into the vessel 1 through the duct 9, which may be by the application of a fan or other forced air flow to the duct 9 or by the application of suction to the outlet opening 18. As more fully discussed hereinafter, the unique construction of the plate assembly 4 enables the apparatus to be operated under either fluidized or non-fluidized conditions above or below the critical threshold rate of flow of the fluid to maintain complete fluidized suspension of the charge material. For granulating operation of the apparatus, a desired quantity of powdered charge material is fed into the work area 15 of the vessel 1 through the inlet chute 12. As will be understood, the rotary action of the plate assembly 4 centrifugally propels the charge material radially outwardly to impact against the cylindrical wall 1a from which the charge material moves axially upwardly within the work area 15 and then gravitationally falls radially inwardly toward the center of the plate assembly 4, while at the same time the plate assembly 4 imparts a circular motion to the charge material circumferentially along the cylindrical wall 1a. As a net result, the charge material moves in a circularly spiraling fashion about the work area 15, as represented by directional arrows C in FIG. 2. Compatibly, the gaseous flow from the duct 9 is directed upwardly through the slots 24 and emitted therefrom in generally the same radially outward direction as the rotating plate assembly 4 imparts to the charge material to compliment and enhance the radial circulation of the charge material outwardly along the plate assembly 4, axially upwardly along the cylindrical wall 1a, and radially inwardly and downwardly in return to the plate assembly 4. At the same time, the S-shape of slots 24, complemented by this radial flow of fluid, serves to prevent the charge material from falling gravitationally through the slots 24, even under non-fluidized conditions at flow rates of the treating fluid below the critical fluidizing flow rate, whereby the apparatus is capable of operating under substantially any fluidized or non-fluidized condition for considerable flexibility in selectively controlling granule characteristics. During this circulation of the charge material, a suitable agglomerating solution or other binder liquid is injected into the work area 15 through the spray arrangement 10 and impinges upon the charge material within the work area 15. The described circulation of the charge material within the work area 15 effectively exposes substantially all of the charge material uniformly to the binder liquid spray so that the powdered charge material begins to uniformly adhere into agglomerated granular form and, as rotation of the plate assembly 4 progresses, the continued circulation of the charge material and impacting thereof against the plate assembly 4 and the cylindrical wall 1a progressively shapes and densifies the granules into substantially uniform spherical shapes of substantially uniform density. The flow of the gaseous fluid through the work area 15, in addition to enhancing and complimenting the circulation of the charge material, also effectively drives off the binder liquid from the agglomerated granules as the granulation operation progresses to effectively dry the resultant granules produced. As desired, the gaseous fluid may be heated to promote this drying action.

As aforementioned, the deflection plates 8b compliment the operation of the rotating plate assembly 4 by deflecting the charge material axially to add a component of upwardly and downwardly axial movement of the material within the work area 15. Specifically, the deflection plates 8b deliver a repeated impulsive upward deflecting force to the charge material which, together with the subsequent natural gravitational falling of the material, produces a vibratory-like effect within the charge material to assist in densifying and spherically shaping the granules of the charge material. However, of course, it is to be expressly understood that the present granulating and coating apparatus may be equally effectively operated utilizing the rotating plate assembly 4 without the deflection plate arrangement. As will also be understood, the apparatus is equally operative for both film and powder coating operations by the continued spraying of binder solution following the formation of the charge material into the desired spherical granular form, with the addition of a suitable powder coating material through the inlet duct 14 if a powder coating is desired. Of course, as desired, an original charge material already in granular form may be utilized for the performance of coating operations.

Figure 6:
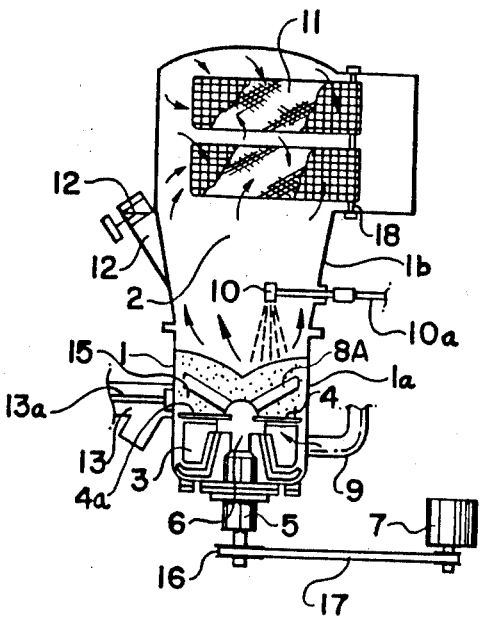
FIG. 6 is another schematic view in vertical cross-section of another embodiment of the fluid-assisted granulating and coating apparatus of the present invention.
Figure 8:
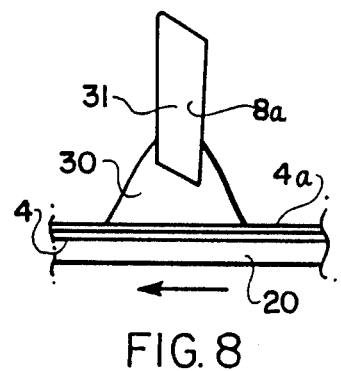
FIG. 8 is a side elevational view of the impulse blade arrangement and the plate assembly of FIG. 7.
Figure 7:
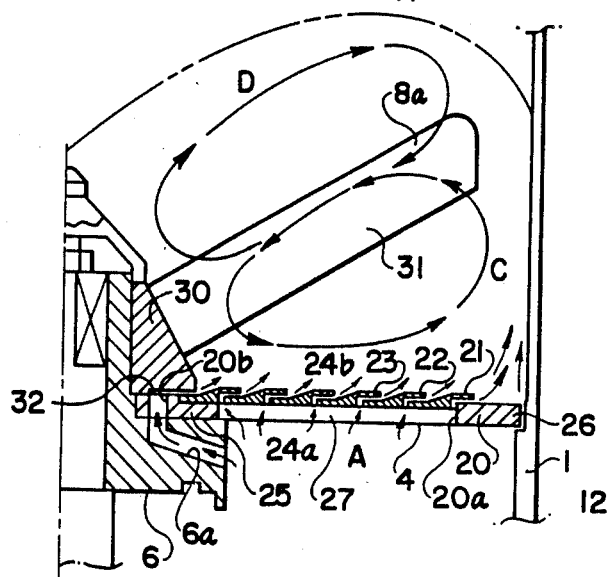
FIG. 7 is an enlarged cross-sectional view of the plate assembly and the impulse blade arrangement of the apparatus of FIG. 6.

Referring now to FIGS. 6-8, a second embodiment of the granulating and coating apparatus of the present invention is illustrated. In this embodiment, the plate assembly 4 and the other components of the apparatus are identical to the components illustrated in and described with respect to FIGS. 1-5, with the exception that the arrangement of the deflection plates 8b is omitted and instead an alternative arrangement of impulse blades 8a is provided. The impulse blade arrangement includes a central hub 30 mounted to the shaft assembly 6 for rotation either integrally therewith or independently thereof in the same rotational direction as the plate assembly 4. A plurality, preferably a pair, of blade-like impulse elements 8a are affixed to the hub 30 in diametric opposition to one another to extend radially outwardly therefrom within the work area 15 at an acutely upwardly inclined spacing relative to the plate assembly 4. Each impulse blade 8a is further angled with respect to the plate assembly 4 with its transverse extent inclined upwardly away from the plate assembly 4 in the direction of rotation thereof to present an impact surface 31 facing in such direction. In this manner, during operation of the granulating and coating apparatus, the arrangement of impulse blades 8a operates to impulsively impact charge material within the upper region of the work area 15 to circulate such material radially inwardly and then axially upwardly and radially outwardly within such upper region essentially oppositely to the aforedescribed direction of material circulation imparted by the rotating plate assembly 4, as indicated by directional arrows D in FIG. 7. As a result, the capacity of the present apparatus for handling greater batch quantities of charge material is substantially increased over conventional apparatus, while still providing improved formation of uniformly spherical and dense granules and uniform film and powder coating of granules. Selective rotation of the impulse blade arrangement at varying speeds independently of the rotating plate assembly 4a promotes flexible operation of the present apparatus to enable the selective control of granule characteristics. This embodiment also differs from that of FIGS. 1-5 in that the supporting hub 20 of the plate assembly 4 and the shaft assembly 6 may be provided with mating ducts 20b,6a, respectively, through which the gaseous suspension fluid may also be directed upwardly into the axially central region of the work area 15 through a small annular gap 32 between the inner ring 25 of the support hub 20 and the mounting hub 30 of the impulse blade arrangement.

Figure 9:
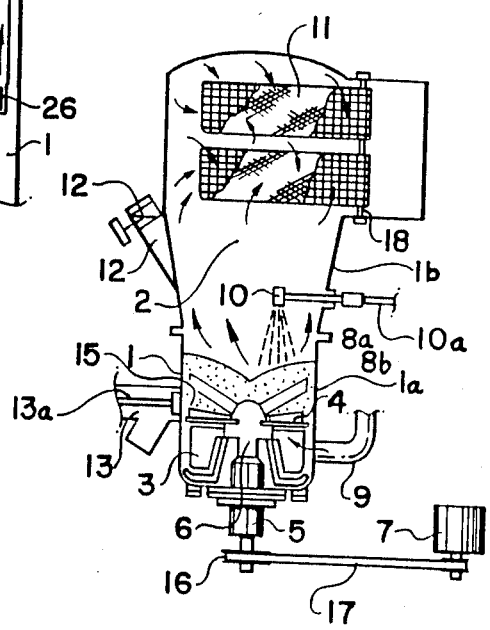
FIG. 9 is another schematic view in vertical cross-section of another embodiment of the fluid-assisted granulating and coating apparatus of the present invention.

It is also contemplated in accordance with the present invention that the present granulating and coating apparatus may utilize the deflection plate arrangement of FIGS. 1-5 in combination with the impulse blade arrangement of FIGS. 6-8, this embodiment of the present apparatus being schematically shown in FIG. 9. Preferably, in such embodiment, a pair of the deflection plates 8b and a pair of the impulse blades 8a would be utilized with the blades and plates 8a,8b, respectively, being equidistantly-spaced circumferentially between one another, the blades and plates 8a,8b being shown in FIG. 9 in the same vertical plane as one another solely for purposes of illustration, it being understood that the pair of impulse blades 8a actually appear 90 degrees removed from their disposition as illustrated in FIG. 9. In such embodiment, the overall charge material circulation within the work area 15 is substantially increased to provide the greatest charge material capacity of any embodiment of the present invention.

A number of distinct advantages over conventional granulating and coating apparatus are provided by the present invention. Importantly, the particular construction of the plate assembly 4 with a planar radial work face 4a and with radially outwardly directed fluid flow slots 24 of increasing cross-sectional size radially outwardly along the plate assembly 4 cooperate to provide uniform treating fluid flow over the entire radial work surface 4a of the plate assembly 4 to provide enhanced material circulation within the entire work area 15 in a desirable circularly spiraling manner as described without undesirable concentration or stagnation of the charge material in any region of the work area 15 and without undesirable falling of the charge material through or becoming clogged in the fluid flow openings to which conventional granulating and coating apparatus are susceptible. Indeed, the S-shape of the annular slots 24 in the plate assembly 4, assisted by the flow of the treating fluid upwardly and radially outwardly therethrough, is sufficiently effective in preventing gravitational falling of the charge material through the slots 24 and clogging of the slots 24 by the charge material to enable the apparatus to be selectively operated under either fluidized or non-fluidized conditions at substantially any practical rate of flow of the treating fluid through the vessel 1, in substantial contrast to existing conventional fluidized bed granulating and coating apparatus. As a result, the apparatus provides a remarkable and unusual degree of flexibility in the variation and control of the characteristics of the granules produced by the present apparatus. Specifically, it has been found that, by operating the apparatus under non-fluidized conditions at treating fluid flow rates below the critical rate necessary to fully suspend the charge material, granulating operations may be carried out under so-called "fixed bed" conditions to produce relatively dense, hard and highly spherical granules. On the other hand, operation of the present apparatus under fully developed fluidized bed conditions at treating fluid flow rates sufficient to fully suspend the charge material has been found effective to produce relatively porous, soft and irregularly shaped granules. Furthermore, operation of the present apparatus under conditions between fixed bed and fully developed fluidized bed conditions produces granules of an intermediate density, hardness and spherical uniformity.

The enhanced evenness and thoroughness of material circulation within the work area 15 further serves importantly to increase the material batch capacity of the present apparatus over that of conventional granulating and coating apparatus of comparable vessel size. Furthermore, the provision in the present invention of an arrangement of impulse blades 8a and an arrangement of deflection plates 8b, which may be used in conjunction with the rotating plate assembly 4 either individually or in combination, adds further flexibility in the operation and control of the present granulating and coating apparatus to selectively vary the characteristics of granules produced with the present apparatus, while also permitting further increases in the capacity of the apparatus up to four times that of conventional apparatus of comparable size.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. Apparatus for fluid-assisted granulating or coating of a charge material utilizing a binder liquid, said apparatus comprising:

an upright vessel having an annular wall defining a work area, said vessel having a material charge port and a material discharge port opening into said work area;

plate means mounted within said vessel below said work area transversely of said annular wall at a close peripheral spacing thereto for rotation about an axis extending axially of said annular wall for circulating charge material within said work area centrifugally outwardly toward and circumferentially along said annular wall, said plate means including a plurality of annular elements of generally S-shaped cross-section arranged radially side-by-side one another in substantially coplanar overlapping relation defining a generally planar radial work surface facing said work area and defining a plurality of partially covered annular slots between said annular elements opening at radial spacings to one another in a generally radially outward direction through said work surface for restricting passage of charge material into said slots;

means for emitting a binder liquid into said work area for impingement on charge material within said work area; and means for conveying a gaseous fluid from below said plate means upwardly through said annular slots for emission therefrom in a generally radially outward direction for enhanced circulation of charge material radially outwardly within said work area.

2. Fluid-assisted granulating or coating apparatus according to claim 7 and characterized further in that each said annular slot includes an inlet portion opening at the side of said plate means opposite said radial work surface, an outlet portion opening at said radial work surface at a radially outward spacing from said inlet portion, and a connecting portion extending generally radially therebetween.

3. Fluid-assisted granulating or coating apparatus according to claim 7 and characterized further in that said annular elements are mounted to a support hub for unitary rotation therewith.

4. Fluid-assisted granulating or coating apparatus according to claim 1 and characterized further in that said annular slots are respectively of gradually increasing cross-sectional areas in the direction radially outwardly of said plate means.

5. Fluid-assisted granulating or coating apparatus according to claim 1 and characterized further by deflection means associated with said plate means for rotation therewith for imparting increased upward movement of charge material within said work area.

6. Fluid-assisted granulating or coating apparatus according to claim 5 and characterized further in that said deflection means includes a plurality of deflection elements affixed to said plate means, each said deflection element having a leading edge portion extending radially along said work surface and having a material deflection surface extending from said edge portion in angular relation to said work surface in the circumferential direction opposite the direction of rotation of said plate means for deflecting charge material to enhance circulation thereof axially within said work area.

7. Fluid-assisted granulating or coating apparatus according to claim 6 and characterized further in that said material deflection surface of each said deflection element is of an increasing dimension circumferentially and axially of said plate means in the direction radially outwardly thereof for increased deflection of charge material adjacent said annular wall.

8. Fluid-assisted granulating or coating apparatus according to claim 7 and characterized further in that said deflection means includes a pair of said deflection elements arranged at substantially diametrically opposite sides of said plate means, each said deflection element being of a plate-like configuration oriented at an acute angle to said work surface and tapered increasingly radially outwardly with respect to said plate means.

9. Fluid-assisted granulating or coating apparatus according to claim 5 and characterized further by impulse means arranged for rotation within said work area at a spacing above said plate means for impulsively circulating charge material radially inwardly within said work area to enhance material circulation and increase material capacity of said apparatus.

10. Fluid-assisted granulating or coating apparatus according to claim 1 and characterized further by impulse means arranged for rotation within said work area at a spacing above said plate means for impulsively circulating charge material radially inwardly within said work area to enhance material circulation and increase material capacity of said apparatus.

11. Fluid-assisted granulating or coating apparatus according to claim 10 and characterized further in that said impulse means is arranged for rotation coaxially with and in the same direction as said plate means, said impulse means including a plurality of impulse elements extending radially outwardly and upwardly at an acute angle with respect to said plate means.

12. Fluid-assisted granulating or coating apparatus according to claim 11 and characterized further in that each said impulse element is of a blade-like configuration having an impact surface inclined upwardly away from said plate means in the direction of rotation thereof.

13. Fluid-assisted granulating or coating apparatus according to claim 12, and characterized further in that said impulse means includes a pair of said impulse elements arranged at substantially diametrically opposite sides of said plate means.

14. Fluid-assisted granulating or coating apparatus according to claim 11 and characterized further in that said impulse means is arranged for rotation integrally with said plate means.

15. Fluid-assisted granulating or coating apparatus according to claim 10 and characterized further in that said impulse means is arranged for rotation independently of said plate means.

16. Apparatus for fluid-assisted granulating or coating of a charge material utilizing a binder liquid, said apparatus comprising:
an upright substantially enclosed vessel having an annular cylindrical wall defining a work area, said vessel having a material charge port and a material discharge port opening into said work area;
a circular planar plate assembly mounted within said vessel below said work area radially of said cylindrical wall at a close peripheral spacing thereto for rotation about the axis of said cylindrical wall for circulating charge material within said work area centrifugally outwardly toward and circumferentially along said annular wall, said plate assembly having a support hub and a plurality of circular elements of generally S-shaped cross-section mounted to said support hub concentrically side-by-side one another in overlapping substantially coplanar spaced relation for unitary rotation with said support hub, said circular elements defining a substantially planar radial work surface facing said granulation work area and a plurality of circular slots between said circular elements, each said circular slot including an inlet portion opening at the side of said plate assembly opposite said radial work surface, an outlet portion opening at said radial work surface at a radially outward spacing from said inlet portion, and a connecting portion extending generally radially therebetween for opening of said circular slots in a generally radially outward direction with said circular slots partially covered for restricting passage of charge material into said circular slots;
means for emitting a binder liquid into said work area for impingement on charge material within said work area; and
means for conveying a gaseous fluid from below said plate assembly upwardly through said annular slots for emission of said fluid from said annular slots in a generally radially outward direction for enhanced circulation of charge material radially outwardly direction for enhanced circulation of charge material radially outwardly within said work area.

17. Apparatus for fluid-assisted granulating or coating of a charge material according to claim 16 and characterized further in that said circular slots are respectively of gradually increasing cross-sectional areas in the direction radially outwardly of said plate assembly.

18. Apparatus for fluid-assisted granulating or coating of a charge material according to claim 16 and characterized further by deflection means associated with said plate means for rotation therewith for imparting increased upward movement of charge material within said work area, said deflection means including a plurality of deflection elements affixed to said plate means, each said deflection element having a leading edge portion extending radially along said work surface and having a material deflection surface extending from said edge portion in angular relation to said work surface in the circumferential direction opposite the direction of rotation of said plate means, said material deflection surface of each said deflection element being of an increasing dimension circumferentially and axially of said plate means in the direction radially outwardly thereof for increased deflection of charge material adjacent said annular wall.

19. Apparatus for fluid-assisted granulating or coating of a charge material according to claim 18 and characterized further in that said deflection means includes a pair of said deflection elements arranged at substantially diametrically opposite sides of said plate means, each said deflection element being of a plate-like configuration oriented at an acute angle to said work surface and tapered increasingly radially outwardly with respect to said plate means.

20. Apparatus for fluid-assisted granulating or coating of a charge material according to claim 18 and characterized further by impulse means arranged for rotation within said work area coaxially with and in the same direction as said plate means at a spacing thereabove for impulsively circulating charge material radially inwardly within said work area to enhance material circulation and increase material capacity of said apparatus, said impulse means including a plurality of impulse elements extending radially outwardly and upwardly at an acute angle with respect to said plate means.

21. Apparatus for fluid-assisted granulating or coating of a charge material according to claim 16 and characterized further by impulse means arranged for rotation within said work area coaxially with and in the same direction as said plate means at a spacing thereabove for impulsively circulating charge material radially inwardly within said work area to enhance material circulation and increase material capacity of said apparatus, said impulse means including a plurality of impulse elements extending radially outwardly and upwardly at an acute angle with respect to said plate means.

22. Apparatus for fluid-assisted granulating or coating of a charge material according to claim 21 and characterized further in that said impulse means includes a pair of said impulse elements arranged at substantially diametrically opposite sides of said plate means, each said impulse element being of a blade-like configuration having an impact surface inclined upwardly away from said plate means in the direction of rotation thereof.

23. Apparatus for fluid-assisted granulating or coating of a charge material utilizing a binder liquid, said apparatus comprising:
an upright vessel having an annular wall defining a work area, said vessel having a material charge port and a material discharge port opening into said work area;
plate means mounted within said vessel below said work area transversely of said annular wall at a close peripheral spacing thereto for rotation about an axis extending axially of said annular wall for circulating charge material within said work area centrifugally outwardly toward and circumferentially along said annular wall, said plate means having a generally planar radial work surface facing said work area and having a plurality of annular slots opening at radial spacings to one another in a generally radially outward direction through said work surface;
means for emitting a binder liquid into said work area for impingement on charge material within said work area;
means for conveying a gaseous fluid from below said plate means upwardly through said annular slots for emission therefrom in a generally radially outward direction for enhanced circulation of charge material radially outwardly within said work area; and
deflection means associated with said plate means for rotation therewith for imparting increased upward movement of charge material within said work area, said deflection means including a plurality of deflection elements affixed to said plate means, each said deflection element having a leading edge portion extending radially along said work surface and having a material deflection surface extending from said edge portion in angular relation to said work surface in the circumferential direction opposite the direction of rotation of said plate means for deflecting charge material to enhance circulation thereof axially within said work area.

24. Fluid-assisted granulating or coating apparatus according to claim 23 and characterized further in that said material deflection surface of each said deflection element is of an increasing dimension circumferentially and axially of said plate means in the direction radially outwardly thereof for increased deflection of charge material adjacent said annular wall.

25. Fluid-assisted granulating or coating apparatus according to claim 24 and characterized further in that said deflection means includes a pair of said deflection elements arranged at substantially diametrically opposite sides of said plate means, each said deflection element being of a plate-like configuration oriented at an acute angle to said work surface and tapered increasingly radially outwardly with respect to said plate means.

26. Fluid-assisted granulating or coating apparatus according to claim 23 and characterized further by impulse means arranged for rotation within said work area at a spacing above said plate means for impulsively circulating charge material radially inwardly within said work area to enhance material circulation and increase material capacity of said apparatus.

27. Fluid-assisted granulating or coating apparatus according to claim 26 and characterized further in that said impulse means is arranged for rotation coaxially with and in the same direction as said plate means, said impulse means including a plurality of impulse elements extending radially outwardly and upwardly at an acute angle with respect to said plate means.

28. Fluid-assisted granulating or coating apparatus according to claim 27 and characterized further in that each said impulse element is of a blade-like configuration having an impact surface inclined upwardly away from said plate means in the direction of rotation thereof.

29. Fluid-assisted granulating or coating apparatus according to claim 28 and characterized further in that said impulse means includes a pair of said impulse elements arranged at substantially diametrically opposite sides of said plate means.

30. Fluid-assisted granulating or coating apparatus according to claim 26 and characterized further in that said impulse means is arranged for rotation integrally with said plate means.

31. Fluid-assisted granulating or coating apparatus according to claim 26 and characterized further in that said impulse means is arranged for rotation independently of said plate means.

* * * * *

UNITED STATES PATENT OFFICE
CERTIFICATE OF CORRECTION

Patent No. 4,724,794     Dated February 16, 1988

Inventor(s) Yoshihiro Itoh

It is certified that error appears in the above-identified patent and that said Letters Patent is hereby corrected as shown below:

Abstract, line 3    delete "coaxilly" and insert therefor — coaxially —
Column 1, line 19    delete "andto" and insert — and to —
Column 9, line 34    delete "granulesof" and insert — granules of —
Column 12, line 32    delete "7" and insert — 1 —
Column 12, line 40    delete "7" and insert — 1 —
Column 13, line 40    after "12" delete ","
Column 13, line 45    delete "11" and insert — 10 -
Column 14, lines 25-26    After "[out]wardly", delete "direction for enhanced circulation of charge material radially outwardly"

Signed and Sealed this

Thirtieth Day of January, 1990

Attest:

JEFFREY M. SAMUELS

Attesting Officer     Acting Commissioner of Patents and Trademarks